United States Patent [19]
Bernard

[11] 4,229,933
[45] Oct. 28, 1980

[54] SEPARABLE MOWER BLADE

[76] Inventor: Roy A. Bernard, Rte. 3, Box 366, St. Martinville, La. 70582

[21] Appl. No.: 18,342

[22] Filed: Mar. 7, 1979

[51] Int. Cl.³ .......................................... A01D 55/18
[52] U.S. Cl. ................................................. 56/295
[58] Field of Search ........................................ 56/295

[56] References Cited

U.S. PATENT DOCUMENTS

| | | |
|---|---|---|
| 2,793,484 | 5/1957 | McNeill et al. ............... 56/295 X |
| 2,898,725 | 8/1959 | Roesel ................................. 56/295 |
| 3,321,894 | 5/1967 | Ingram ............................... 56/295 |
| 3,327,460 | 6/1967 | Blackstone ....................... 56/295 |
| 3,683,606 | 8/1972 | Staines ............................... 56/295 |
| 3,918,241 | 11/1975 | Stillions ............................. 56/295 |
| 3,949,541 | 4/1976 | Henry ................................ 56/295 |
| 4,043,104 | 8/1977 | Jones ................................. 56/295 |
| 4,058,959 | 11/1977 | Moss et al. ........................ 56/295 |
| 4,062,171 | 12/1977 | Rose ................................... 56/295 |

*Primary Examiner*—Jay N. Eskovitz
*Attorney, Agent, or Firm*—Blair, Brown & Kreten

[57] ABSTRACT

Disclosed herein is a separable mower blade comprising a stem portion affixed to the drive axis of a rotary type mower shaft, a blade connected thereto and a slot disposed on the blade for reception of a bolt which is affixed to the stem portion so as to fasten the two together. A shroud is provided over the area of interconnection so as to firmly affix the two elements, the blade and the stem together and is so constructed to allow its easy removal so that blades may be taken off with a minimal amount of time and tools used therefore.

5 Claims, 7 Drawing Figures

SEPARABLE MOWER BLADE

BACKGROUND OF THE INVENTION

The invention relates generally to lawn mower blades capable of being dissociated from the remainder of the mower in which only the blade portion is separable therefrom and easily affixable thereto so that a minimal amount of tools and time are required to change the blades as for sharpening.

The following represents the prior art as the inventor is aware:

U.S. Pat. Nos. 2,793,484 McNeill et al; 3,918,241 Stillions;
U.S. Pat. Nos. 3,320,733 Kirk; 4,043,104 Jones;
U.S. Pat. Nos. 3,321,894 Ingram; 4,062,171 Rose;
U.S. Pat. No. 3,507,104 Kline et al.

It would appear that Ingram most closely provides a structure similar to that which the present application defines, but it should be apparent that neither Ingram nor the remaining references define a structure substantially as claimed hereinafter and further is not seen to provide a rigid interconnection between the mower stem and the blade as does the present invention while simultaneously providing a structure which is easily disassemblable. The use of a cotter pin 27 overlying the connecting means 13 is seen to be a quite hazardous expedient since the integrity of the Ingram system would therefore rest solely on the cotter pin not failing so that the blade does not become a dangerous projectile.

SUMMARY OF THE INVENTION

Accordingly, the ensuing detailed description of the drawings and specification and claims contemplates providing a separable mower blade which provides a greater degree of assurance that the structure when being used will not separate.

A further object contemplates providing a separable blade which does not require the use of many tools.

A further object contemplates providing a separable blade which is easy to replace.

A further object contemplates providing a separable blade which is easy to install, durable in construction, and relatively inexpensive to manufacture.

These and other objects will be made manifest when considering the following detailed specification and drawings.

BRIEF DESCRIPTION OF THE PREFERRED EMBODIMENT

Figure 1:
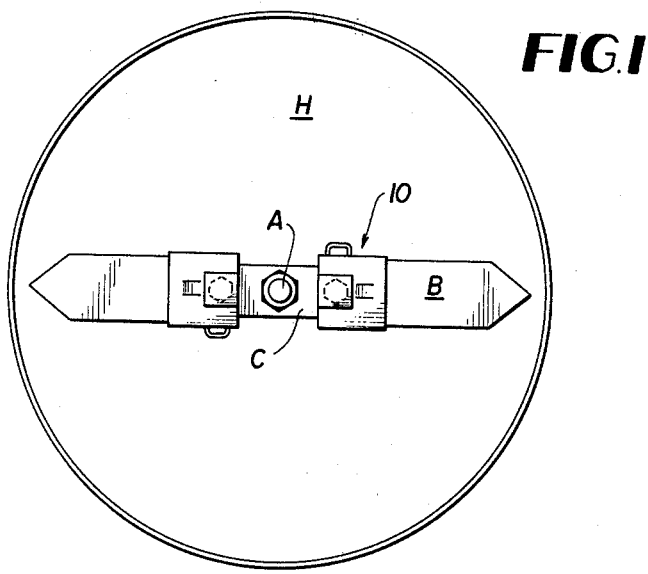
FIG. 1 is a bottom plan view of the apparatus according to the present invention disposed within a housing.
Figure 2:
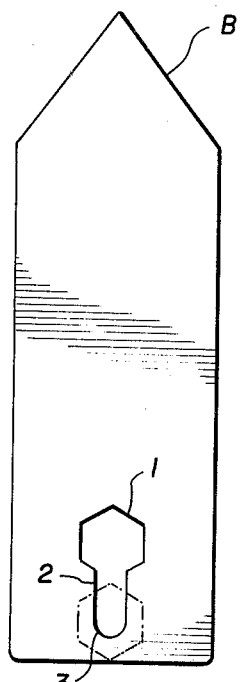
FIG. 2 shows the blade element disassociated from the mower housing.
Figure 3:
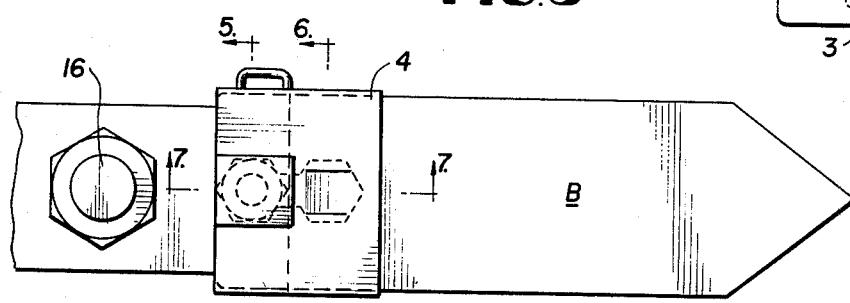
FIG. 3 shows the stem of the mower attached to the blade in a bottom view thereof.
Figure 5:
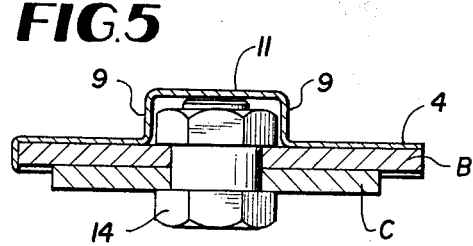
FIG. 5 is a sectional view taken along lines 5—5 of FIG. 3.
Figure 4:
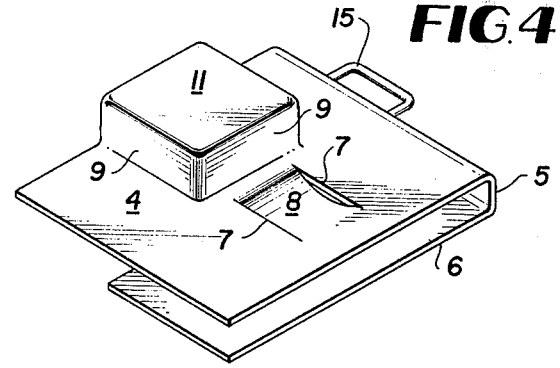
FIG. 4 is a perspective view of the shroud which overlies the interconnection between the blade and the stem.
Figure 6:
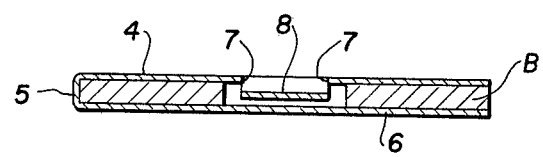
FIG. 6 is a sectional view taken along lines 6—6 of FIG. 3.
Figure 7:
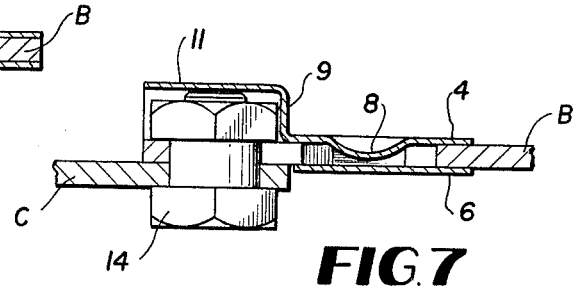
FIG. 7 is a sectional view taken along lines 7—7 of FIG. 3.

Referring to the drawings now, wherein like reference numerals refer to like parts throughout the several drawing figures, reference numeral 10 is directed to the interconnection and shroud according to the present invention.

The invention provides for a mower bar stem portion C affixed to the axle A which drives the mower disposed within the housing H. A blade B is connected to the stem C and to this end, an elongate slot 2 is provided on the blade which terminates in a hexagonal cut out 1, said hexagonal cut out 1 being disposed closer to the blade tip for purposes to be explained hereinafter.

The stem C is provided with a bolt affixed to a terminal portion thereof which is so fashioned that the hexagonal cut out 1 overlies a top portion of the bolt 14 and thereafter the blade is pulled outwardly so that the slot 2 underlies the hex head of the nut associated with the bolt. The bolt thereafter is tightened down so that there is a snug interconnection between the two elements, namely the stem and the blade. A housing is provided which overlies this area of interconnection and is provided with a handle 15 disposed on one side thereof of the protective shroud which has a substantially U-shaped configuration. This edge 5 terminates laterally in a bottom face 6 and a top face 4, the bottom face 6 being substantially planar.

The top face 4 is provided with a central depressed area 8 made of resilient spring type material and the depressed area 8 is provided with a pair of slits 7 parallel to the edge 5 and is centrally located on the top face of the shroud. Behind the depressed area 8 is an upwardly extending cover of substantially rectangular configuration having three side walls 9 a top face 11 and an open back face. The shroud of course is optional.

It will be appreciated that by use of the handle 15 this shroud can be laterally translated on the blade and stem along the area of interconnection so that when thus engaged, the depressed area 8 is caused to ride within the hexagonal cut out 1 providing a resilient retention area thereby, and the upstanding portion behind the depressed area is caused to overly the nut and bolt 14. Side walls 9 of the upstanding portion have a tolerance that will cause the nut to experience resistance to any attempted rotation so that the interconnection between these two is secure. The threads on the nut and bolt 14 is such that the direction of rotation of the blade tends to tighten this nut rather than loosen same.

Having thus described the invention, it should be appreciated that numerous structural modifications are contemplated as being a part of this invention as specified hereinabove and as delineated hereinbelow by the claims.

What is claimed is:

1. A blade which is separable from a stem of a mower bar in which the area of interconnection comprises a cut away slot disposed on said blade which extends to a hexagonal cut out area nearer a tip of the blade, and a bolt extending through a terminal portion of the stem having a nut with a substantially hexagonal configuration whereby said stem and said blade can be interconnected by juxtaposing the hexagonal bolt with said hexagonal cut out area, and sliding said blade outwardly so that said hexagonal bolt rides within said slot and a protective shroud means overlying the area of interconnection between said blade and said stem which further retains said blade and stem, said shroud means having a depression which resides within said hexagonal cut out area to resist relative motion of said blade and said stem.

2. The device of claim 1 wherein said protective shroud means overlying the area of interconnection has a U-shaped configuration wherein the bottom of said U defines a side edge, a handle disposed on said side edge, and a planar bottom face.

3. The device of claim 2 wherein said shroud means further includes a planar top face in which a central area is provided with said depression which has slits on opposed sides of said depression in which said slots extend radially outward towards the tip of the blade up to walls of said hexagonal cutout for added resistance.

4. The device of claim 3 wherein means for overlying said bolt are provided which include an upstanding portion lying behind said depression relative to the blade having a top portion connecting three upstanding side walls whereby said upstanding portions overlie the bolt in such a manner as to discourage relative rotation of the nut relative to the bolt.

5. The device of claim 4 in which said depression is providing with a spring type resilience.

* * * * *